United States Patent
Armstrong et al.

(10) Patent No.: US 7,802,252 B2
(45) Date of Patent: Sep. 21, 2010

(54) METHOD AND APPARATUS FOR SELECTING THE ARCHITECTURE LEVEL TO WHICH A PROCESSOR APPEARS TO CONFORM

(75) Inventors: William J. Armstrong, Rochester, MN (US); Richard L. Arndt, Austin, TX (US); Michael J. Corrigan, Rochester, MN (US); Giles R. Frazier, Austin, TX (US); Timothy R. Marchini, Hyde Park, NY (US); Cathy May, Millwood, NY (US); Naresh Nayar, Rochester, MN (US); John T. O'Quin, II, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 11/621,393

(22) Filed: Jan. 9, 2007

(65) Prior Publication Data

US 2008/0168258 A1    Jul. 10, 2008

(51) Int. Cl.
*G06F 9/46* (2006.01)
*G06F 9/50* (2006.01)

(52) U.S. Cl. ............................ 718/1; 718/104; 718/107; 712/1; 712/43; 712/229

(58) Field of Classification Search ............. 712/1, 712/43, 229; 718/1, 104, 107
See application file for complete search history.

(56) References Cited

U.S. PATENT DOCUMENTS

| | | | |
|---|---|---|---|
| 5,555,414 A * | 9/1996 | Hough et al. | 710/261 |
| 5,613,101 A | 3/1997 | Lillich | |
| 7,146,482 B2 * | 12/2006 | Craddock et al. | 711/200 |
| 7,243,213 B2 * | 7/2007 | Pagni et al. | 712/209 |
| 2002/0078262 A1 | 6/2002 | Harrison et al. | |
| 2002/0199180 A1 | 12/2002 | Donaldson et al. | |
| 2003/0126587 A1 | 7/2003 | Rosner et al. | |
| 2004/0158822 A1 | 8/2004 | Sandham et al. | |
| 2005/0022176 A1 | 1/2005 | Ramachandran et al. | |
| 2006/0005200 A1 * | 1/2006 | Vega et al. | 718/108 |

\* cited by examiner

*Primary Examiner*—William M Treat
(74) *Attorney, Agent, or Firm*—Dillon & Yudell LLP

(57) ABSTRACT

A method and system for selecting the architecture level to which a processor appears to conform within a computing environment when executing specific logical partitions or programs and performing migration among different levels of processor architecture. The method utilizes a "processor compatibility register" (PCR) that controls the level of the architecture that the processor appears to support. In one embodiment, the PCR is accessible only to super-privileged software. The super-privileged software sets bits in the PCR that specify the architecture level that the processor is to appear to support so that when the program runs on the processor, the processor behaves in accordance with the architecture level for which the program was designed.

20 Claims, 6 Drawing Sheets

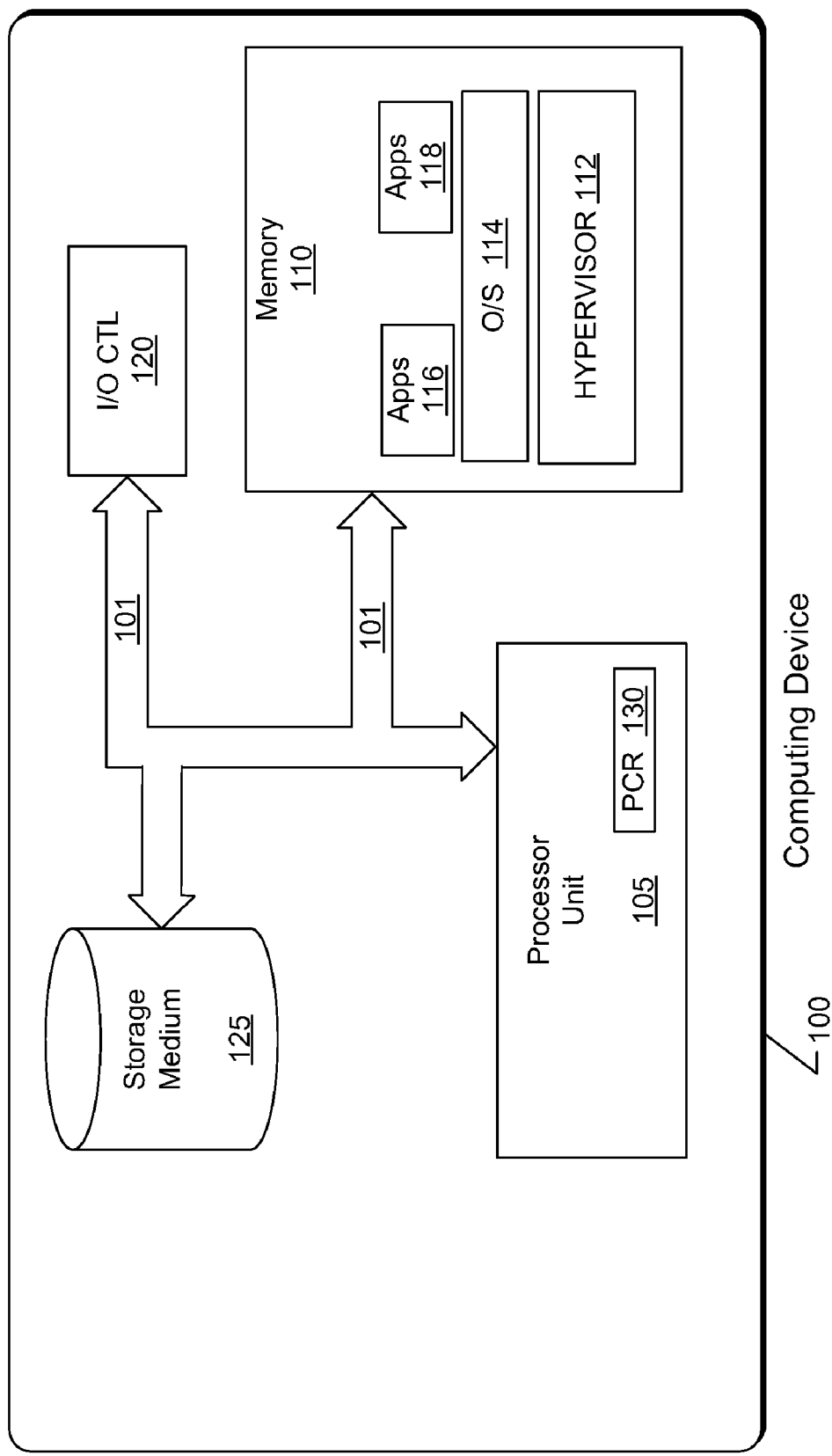

METHOD AND APPARATUS FOR SELECTING THE ARCHITECTURE LEVEL TO WHICH A PROCESSOR APPEARS TO CONFORM

BACKGROUND OF THE INVENTION

1. Technical Field

The present invention generally relates to processors and more particularly to methods for configuring processor architecture for compatibility with software.

2. Description of the Related Art

Computing devices today are capable of performing many tasks. Conventional computing devices can execute various types of software products, and include the capability of executing software designed to run on older hardware, such as an older central processing unit (CPU). Computing devices are managed by and execute the software products via an operating system (O/S) that is running on the computing device. The O/S manages the hardware and software resources of the system and provides a stable, consistent way for applications to interact with the computing device's hardware.

Typically, when a program written for a given level of a processor architecture is run on a processor conforming to a later level of the architecture that defines more instructions or other facilities, errors may occur due to the inadvertent usage of the new instructions or facilities. For example, a program written for processor A, conforming to architecture A, contains latent "bugs" such as not setting reserved fields in instructions to "0s" as required by the architecture. When the program is run on processor A, errors may not occur because the processor ignores these fields. If architecture B is then developed and the architecture defines these previously reserved fields, then processor B (conforming to architecture B) no longer ignores these fields, and serious errors may occur when the program executes on processor B.

Unfortunately, in the present state of the art, the only way to solve this problem is to test the program on a processor conforming to the newer level of the architecture to discover any hidden errors. The errors can then be corrected and the program redistributed to all users. This is prohibitively expensive in most cases and sometimes impossible if the program cannot be modified due to lack of support or the unavailability of the source code.

Additionally, a problem may occur when new programs are being written for processor B. For example, the program will utilize the new facilities of processor B, but needs to ensure the program will execute correctly on processor A, which does not have the new facilities. Currently, the only method of ensuring that there are not any latent bugs that cause the program to function improperly on processor A is to test the program on processor A. This method requires processor A be available, and the method may not present a problem if the program is being designed to run on processors conforming to only two levels of the architecture. However, when the program is being designed to run on several previous levels of the architecture, the requirement to obtain samples of processors conforming to each old level of architecture becomes excessively burdensome.

Another problem occurs in situations in which an executing program is to be migrated among a set of processors, each of which may conform to a different level of the architecture. Migration in this context means that the execution state of the program is transferred from one processor to another while the program is still running. A form of program migration is logical partition migration, which is migration in situations where the resources of a single computer are shared by an independent set of logical partitions. Each partition is configured to run at the architecture capabilities of a given architecture level. During partition migration, where an executing logical partition is migrated from a source computer system to a target computer system, the source and target computer systems may have processors that conform to different levels of the processor architecture. Since the program may be designed for a particular level of the architecture, the set of processors to which migration can occur is limited to those processors that conform to the level of the architecture for which the program was designed This restriction can limit the migration possibilities and correspondingly limit the versatility of program migration.

Given the above issues, it is clear that an adequate method for selecting the architecture level to which a processor appears to conform has eluded those skilled in the art, until now. Since it is important for programs to be executable on enhanced (or newer or different) levels of a processor architecture, a mechanism is needed to ensure that if the program executes correctly on a processor conforming to one level of the architecture the program will then run on processors conforming to all subsequent levels of the architecture without being modified, even if the program contains latent bugs such as previously described. Additionally, a mechanism is needed that ensures the program will execute correctly on older processors without requiring the older processors be physically available for testing thereof. Furthermore, a scheme is needed that allows a program to be migrated among all processors regardless of the architecture level supported by the set of processors. Such a scheme will also allow the live migration of a program between two computer systems that have processors that conform to different levels of the architecture.

SUMMARY OF THE INVENTION

Disclosed is a method and system for selecting the architecture level to which a processor appears to conform within a computing environment to enable efficient program execution and migration among different levels of processor architecture. Briefly stated, the method utilizes a "processor compatibility register" (PCR) that controls the level of the architecture that the processor appears to support. In one embodiment, the PCR is accessible only to super-privileged software. The super-privileged software sets bits in the PCR that specify the architecture level that the processor is to appear to support so that when the program runs on the processor, the processor behaves in accordance with the architecture level for which the program was designed.

A processor compatibility register (PCR) associated with the processor is defined by the designer of the computer system. An instruction is received at a processor from a super-privileged software program such as a hypervisor during initiation of the execution of a program or a logical partition. The instruction modifies the processor compatibility register by setting the appropriate level bit(s) corresponding to the level of architecture desired for executing the program or logical partition. The method additionally includes configuring the processor to operate as required by a processor conforming to the specified architecture level, based on the contents of the processor compatibility register.

The PCR includes one or more bits that identify the level of architecture to which the processor is to appear to conform. The PCR bit(s) is set by an instruction that can be executed only when the processor is in super-privileged state. The processor additionally includes logic for: receiving an instruction at the processor wherein the instruction modifies the processor compatibility register; implementing the modification of the processor compatibility register based on the instruction; and selecting the architecture level of the processor based on the contents of the processor compatibility register.

The above as well as additional objectives, features, and advantages of the present invention will become apparent in the following detailed written description.

BRIEF DESCRIPTION OF THE DRAWINGS

The invention itself, as well as a preferred mode of use and further objectives and advantages, will best be understood by reference to the following detailed description of an illustrative embodiment when read in conjunction with the accompanying drawings, wherein:

FIG. 1A is a functional block diagram illustrating a computing device in which implementations of the invention are particularly applicable;

DETAILED DESCRIPTION OF AN ILLUSTRATIVE EMBODIMENT

Figure 1B:
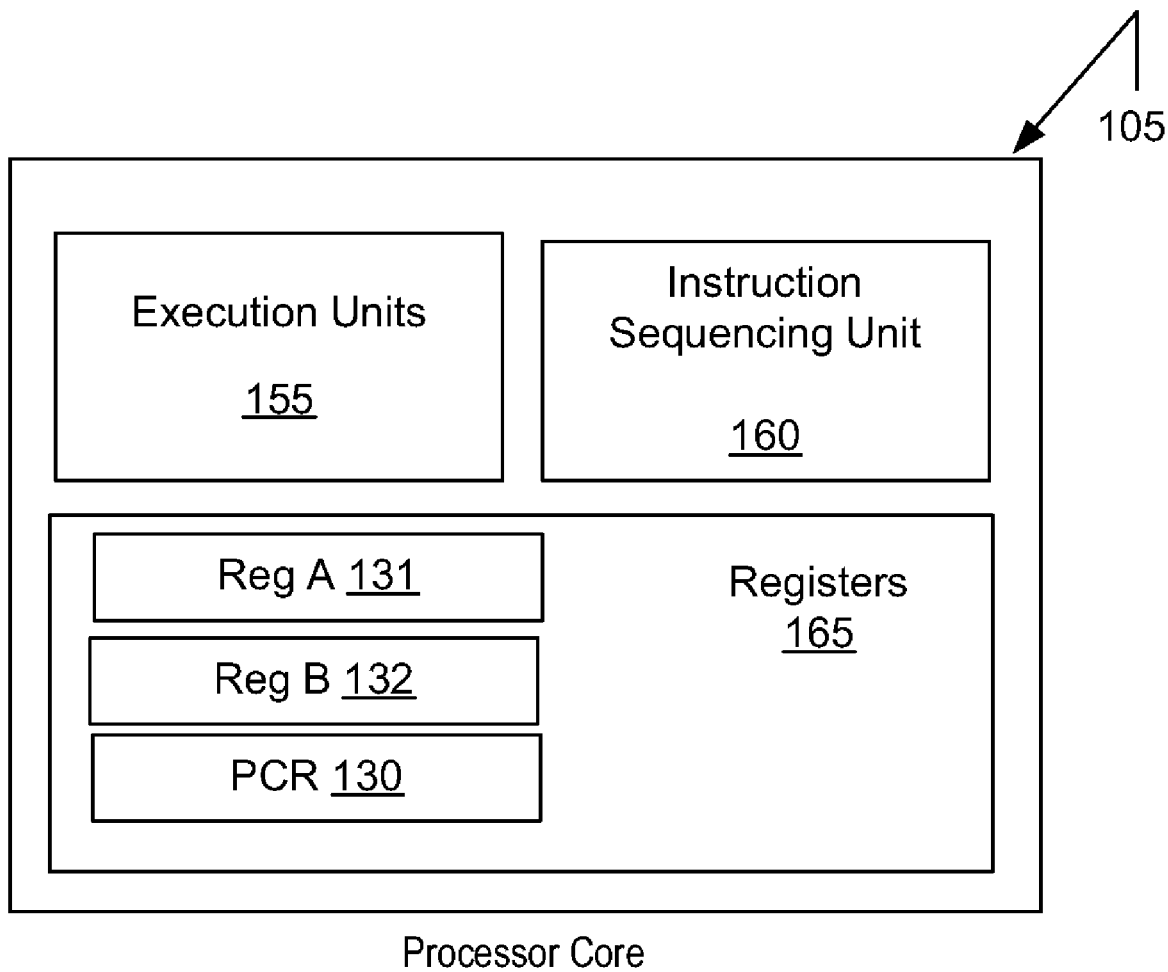
FIG. 1B is a functional block diagram illustrating a processor and components thereof in which implementations of the invention are particularly applicable.

The present invention provides a method for selecting the architecture level to which a processor appears to conform within a computing environment as well as an apparatus for implementing the method. The method utilizes a "processor compatibility register" (PCR), which is an n-bit register that controls the level of the architecture that the processor appears to support. In one described embodiment, the PCR is accessible only to super-privileged software. In computing architecture, one example of super-privileged software is referred to as a "hypervisor". The terms hypervisor and super-privileged software will be utilized interchangeably herein. The hypervisor sets bits in the PCR that specify the architecture level that the processor is to appear to support so that when programs run on the processor, the programs behave as if they are executing on a processor conforming to the specified architecture level. The PCR thereby extends the useful life and applicability of programs by enabling programs designed for one level of the architecture to run on a processor conforming to some other level of the architecture.

Within the PCR, one or more defined "level" bit(s) control whether certain processor instructions, features, functions, registers such as special-purpose registers (SPRs), and other related facilities are available in problem state (i.e., during execution of user-level applications/programs). The PCR bit may also determine how an instruction field value is interpreted or may define other processor behavior. Each level bit controls the availability of facilities that are new in the corresponding level of the processor architecture.

Additionally, the PCR enables programmers to test code in several levels of the processor architecture in situations where processors conforming to some architecture levels are not available. This advantage is important to small enterprises that cannot afford to acquire multiple processor levels and/or in situations where there are a relatively large number of processor levels. The program executing on the processor may be a legacy program designed for execution on a particular legacy processor architecture level. Further, in situations in which an executing program is being migrated among a set of processors, which may each conform to a different/later level of the architecture from the level for which the program was written, the PCR is utilized to provide a seamless migration tool, such that all processors to which the program migrates appear to conform to the same level of the architecture, i.e., the specific level of the architecture for which the program was written. Without the PCR, the set of processors to which migration could occur would be limited to those processors that actually conform to this same level of the architecture. Such a limitation would severely limit the migration possibilities and correspondingly limit the versatility of program migration.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is also understood that the use of specific parameter names are for example only and not meant to imply any limitations on the invention. The invention may thus be implemented with different nomenclature/terminology utilized to describe the above parameters, without limitation.

With reference now to the figures, FIG. 1A is a functional block diagram generally illustrating a computing device 100 in which implementations of the invention are particularly applicable. Computing device 100 may be any computing device, such as a server, a personal computer, a laptop computer, or the like. Although described here in the context of a computing device, it should be appreciated that implementations of the invention could have equal applicability in other devices that execute program code using processors with changing architecture.

In this example, computing device 100 includes processor unit 105, memory 110, input/output controller 120 and storage medium 125, all interconnected via system interconnect 101. Computing device 100 may also include additional components not relevant to the present discussion. Processor unit 105 advantageously includes a microprocessor or a special-purpose processor such as a digital signal processor (DSP), but may, in the alternative be any conventional form of processor, controller, microcontroller, or state machine. Processor unit 105 also comprises PCR 130, which is provided by the invention and utilized as described herein.

Memory 110 comprises multiple levels of software programs/code that are executed by processor unit 105. In this embodiment, the software programs stored in memory 110 include one or more user-level problem code (applications 116, 118), privilege level code (operating system (OS 114), and super-privilege level code (hypervisor 112). In one embodiment described herein, hypervisor 112 retrieves architectural information about the logical partition or program that is being dispatched/executed and sets the bits within PCR 130 to implement the functionality of the invention, as described below in conjunction with FIGS. 2-5.

Storage medium 125 may be implemented as any nonvolatile memory, such as ROM memory, flash memory, or a magnetic disk drive, just to name a few. Storage medium 125 may also be implemented as any combination of those or other technologies, such as a magnetic disk drive with cache (RAM) memory, or the like. In one embodiment, storage medium 125 is used to store data (for both privileged and super-privileged code) during periods when computing device 100 may be powered off or without power.

FIG. 1B depicts a functional block diagram generally illustrating internal components of processor unit 105 by which implementations of the invention are provided. Processor 105 may be fabricated on a single chip, and may include a die upon which execution units 155 (such as load/store unit and/or a floating-point unit or fixed point unit) and instruction sequencing unit (ISU) 160 are provided. Instruction sequencing unit 160 dispatches instructions as appropriate to execution units 155.

Processor 105 also comprises a series of registers 165 of which register A 131, register B 132 and processor compatibility register (PCR) 130 are illustrated. In one embodiment, the processor die is implemented as a semiconductor integrated circuit. In another embodiment, the processor die includes multiple processor cores mounted on the single die, and each of the processor cores contain a PCR (130) mounted thereon.

During execution of processor 105, certain registers, such as PCR 130, may be accessed only by super-privileged software (hypervisor 112), while other registers, e.g., register B 132 may be accessed by both privileged and super-privileged software. Other registers, e.g., register A 131 may be accessed by user-level, privileged and super-privileged software. In an example, PCR 130 is an n-bit register, where n is an integer greater than 1.

It should be understood that FIGS. 1A and 1B are intended to depict the representative major components of computer system 100 at a high level and that individual components may have greater complexity than represented in the figures. It is further appreciated that components other than or in addition to those shown in FIGS. 1A and 1B may be present, and that the number, type and configuration of such components may vary. For example, while illustrated as having a singe processor, it is contemplated that the features of the invention may be implemented in a multi-processor computer system. Also, in one embodiment, each processor may include a PCR, which is independently modifiable to accommodate multiple architecture levels concurrently running on the data processing system under control of one or more hypervisors. FIGS. 1A and 1B are thus presented solely by way of example and not intended to imply any limitations on the invention.

Figure 2A:
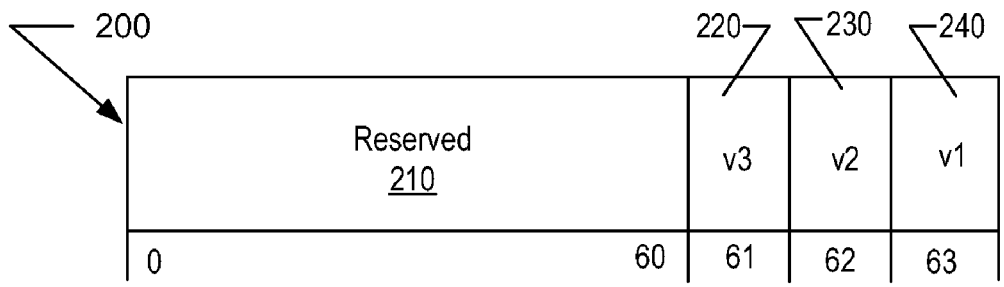
FIGS. 2A-2C are functional block diagrams illustrating "level" bits assigned within example processor compatibility registers (PCRs) according to different embodiments of the invention.
Figure 2B:
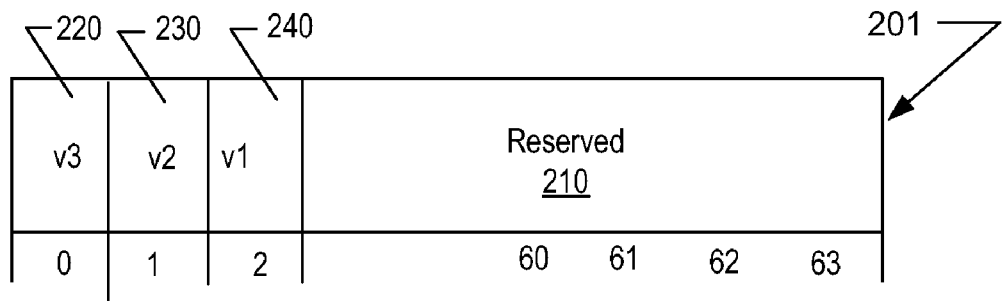
Figure 2C:
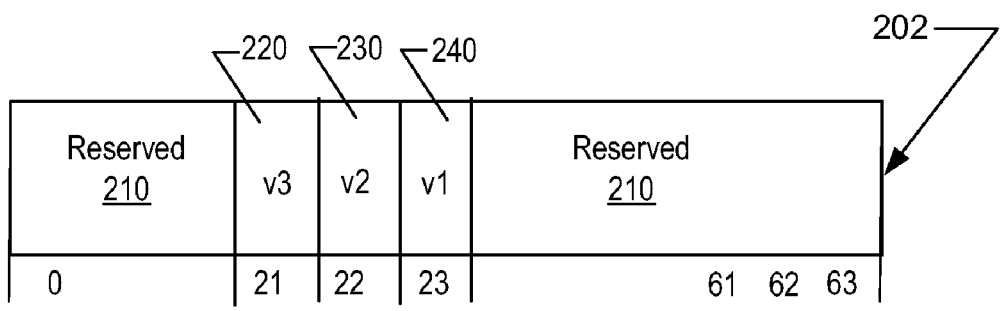

FIGS. 2A-2C are functional block diagrams illustrating three alternative implementations of a processor compatibility register (PCR) (i.e., PCR 200, 201 and 202). The functionality of the three alternative implementations is described with specific reference to PCR 200 (FIG. 2A), and the description is understood to apply to each of the provided PCRs. In one embodiment, PCR 200 is accessible only to super-privileged software (hypervisor), and problem state programs (e.g., user applications) as well as privileged code (e.g., operating systems) cannot read or write to PCR 200.

However, an alternative embodiment is also provided in which PCR 200 may be made accessible to the operating system. PCR 200 is a 64-bit register that includes three low-order bits 220, 230, and 240, which are bits 61, 62, and 63, respectively, of the PCR. Additionally, PCR 200 includes a block of 61 reserved bits 210 (0-60).

The three low-order bits 220, 230, and 240 are used to define the architecture level that the processor is to appear to support while in problem state by controlling whether certain facilities, such as special-purpose registers (SPRs), and other related facilities are available in that state. The remaining bits within PCR 200 are reserved for use in future levels of the architecture. With the alternative implementations, the high order bits of PCR 201 (FIG. 2B) or middle bits of PCR 202 (FIG. 2C) are used to define the architecture level, and the remaining bits are again reserved for use in future levels.

Since each defined bit (220, 230, 240) within PCR 200 controls the architecture level that the processor appears to support only while the processor is in problem state, the bits have no effect on facilities when the processor is not in problem state. Facilities that are made unavailable by the PCR are treated as follows when the processor is in problem state: (a) instructions are treated as illegal instructions; (b) SPRs are treated as if they were not defined for the implementation; and (c) fields in instructions are treated as if the fields were 0s.

In one embodiment, in order to enable the PCR to be updated as new processors are developed, each defined bit, when set to 1, disables the facilities that are new in a given level of the architecture (i.e., are in that level of the architecture but not in the immediately preceding level). Referring to FIGS. 2A-2C, bit v1 240 disables the facilities that are new in v1 of the architecture. Additionally, bit v2 230 disables the facilities that are new in v2 of the architecture. Further, bit v3 220 disables the facilities that are new in v3 of the architecture. If a given low-order defined (i.e., not reserved) bit of the PCR is set to 1, then all higher-order defined bits are also set to 1. In other words, if the facilities that are new in v1 are disabled, then all facilities that are new in subsequent architecture levels (i.e., v2 and v3) must also be disabled. Defining the bits in this manner enables the PCR to be used to make the processor behave as if the processor conformed to each level of the architecture.

For example, if all of the level bits (e.g., v1-v3) are set to "1" then the processor conforms to level v0 of the architecture and all new facilities defined in v1, v2, and/or v3 are disabled. In another example, if the level bit v1 240 is set to "0" and the level bits v2 230 and v3 220 are set to "1" then only new facilities defined in v2 and v3 are disabled. In this case the processor appears to conform to architecture level v1. In yet another example, if the level bits v1 240 and v2 230 are set to "0" and level bit v3 220 is set to "1" then only new facilities defined in v3 are disabled, and the processor appears to conform to architecture level v2. Finally, if all of the level bits (e.g., v1-v3) are set to "0" then none of the facilities are disabled, and the processor appears to conform to architecture level v3. When a next higher order architecture is defined, the next higher-order undefined (i.e., first reserved) bit may be used to disable the facilities for that next higher level of the architecture.

With PCRs 200, 201 and 202, bits that are not assigned to (or being utilized to identify) an architecture level are "reserved" and referred to as reserved bits. Additionally, in one embodiment, PCR 130 may also contain "feature bits" in addition to the level bits. For example, the feature bits might disable a specific feature of the processor (e.g., a set of vector instructions), independent of architecture level. A set of bits within PCR (such as the high order bits) may be utilized for feature bits. One application of this implementation is enabling a design to be shipped with a given feature invisible to software and later upgraded, in the field, to include/display/implement the feature.

In most implementations, there are many more bits in the PCR than levels of the architecture. In implementations where there are more levels of architecture than available PCR bits (e.g., more than 65 levels of the architecture in the example of PCR 200 of FIG. 2A), the low-order bits of the PCR, which correspond to architecture levels that are no longer supported, are reserved. In this implementation, when the most significant bit of the PCR is already assigned to an architecture level and a new architecture level is to be defined, the bit corresponding to the new level of the architecture can be defined as the least significant PCR bit. In this situation, the defined PCR bits are said to "wrap." While wrapping is highly unlikely for a 64-bit PCR, it becomes more likely if the PCR was only 8-bits in length as illustrated by FIGS. 3A-3B, which are now described.

Figure 3A:
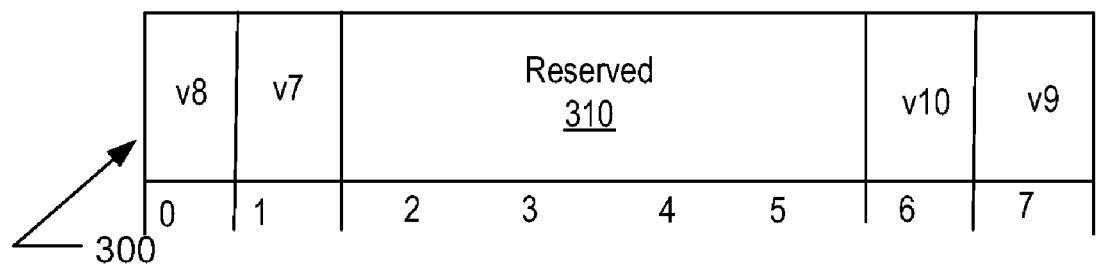
FIGS. 3A and 3B are functional block diagrams illustrating a different example PCR that enables wrapping of overflow level values according to another embodiment of the invention.
Figure 3B:
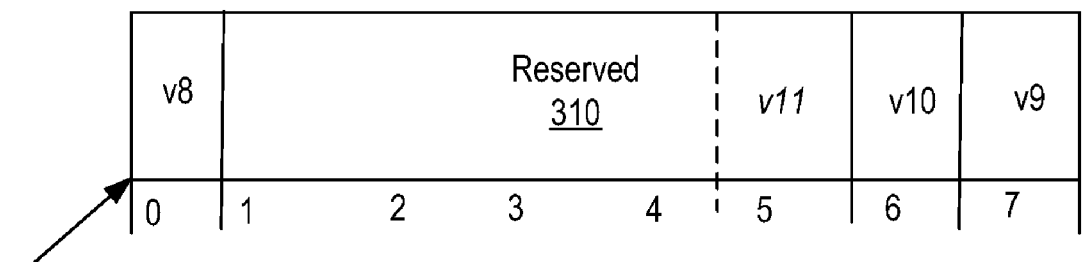

FIGS. 3A-3B are functional block diagrams depicting 8-bit wide PCR 300 in which wrapping of defined architectural levels has occurred. In the example, wrapping occurs when level v9 is developed, and level v9 is defined as the least significant bit of the PCR. Further, in the embodiment illustrated by FIG. 3B, where 12 architecture levels have been defined (i.e., v0-v11), only the last five levels (v7-v11) are supported and bits 1-4 are "reserved" for later re-assigning.

Several variations of the PCR are possible, such as in implementations where processors support multiple privilege levels/states (e.g., problem state, privilege state, super-privileged state, etc.). In such situations, the PCR can be made available to privileged code as well as super-privileged code. This implementation may be desirable in situations in which an operating system needs to specify the processor architecture level for user-level applications.

The PCR can be implemented to affect only specific privilege levels or multiple privilege levels. For example, a PCR may be implemented to affect only problem state code resulting in providing both the super-privileged code and privileged code (e.g., operating system) access to all the processor facilities corresponding to each code's associated privilege level. Alternatively, the PCR may be implemented to affect problem and privileged codes, such as when the operating system is designed for a specific architecture level or if the operating system is not designed to use the PCR. Additionally, the privilege states affected by the PCR may also be programmable.

If a PCR is needed to affect multiple privilege levels, multiple PCRs may be provided with a different PCR applicable for each privilege level. For example, in an implementation having three states including problem state, privileged state, and super-privileged state, a PCR is individually assigned to each state, but the PCR for a particular state is settable only while in a higher privileged state. In this example, the PCR associated with the problem state (e.g., $PCR_{problem}$) would affect only problem state code and the PCR would be accessible in privileged and super-privileged (hypervisor) states. The PCR associated with privileged state (e.g., $PCR_{privilege}$) would affect only privileged state code and the PCR would be accessible in super-privileged state. The PCR associated with super-privileged state ($PCR_{hypervisor}$) would affect only super-privileged state code and the PCR would be accessible only during initial scan-in. Accordingly, in this implementation, the PCR can be accessed only from a privilege state that is more privileged than the privilege state(s) that the PCR affects. Referring to FIG. 1B, for example, registers RegA 131 and RegB 132 may also be PCRs, and each register (RegA 131, RegB 132, and PCR 130) may be assigned to specific ones of the states supported. Each register may also have different sizes, layouts, and bit definitions.

When multiple PCRs are provided as described above, the hypervisor initializes $PCR_{problem}$ and $PCR_{privileged}$ to an initial level when dispatching a partition, and during the life of the partition the operating system is able to revise $PCR_{problem}$ if the operating system wishes. Typically the operating system simply ignores or is unaware of $PCR_{problem}$. The process by which the hypervisor determines the value to which the PCR bits should be set is provided by FIG. 4, which is now described.

Figure 4:
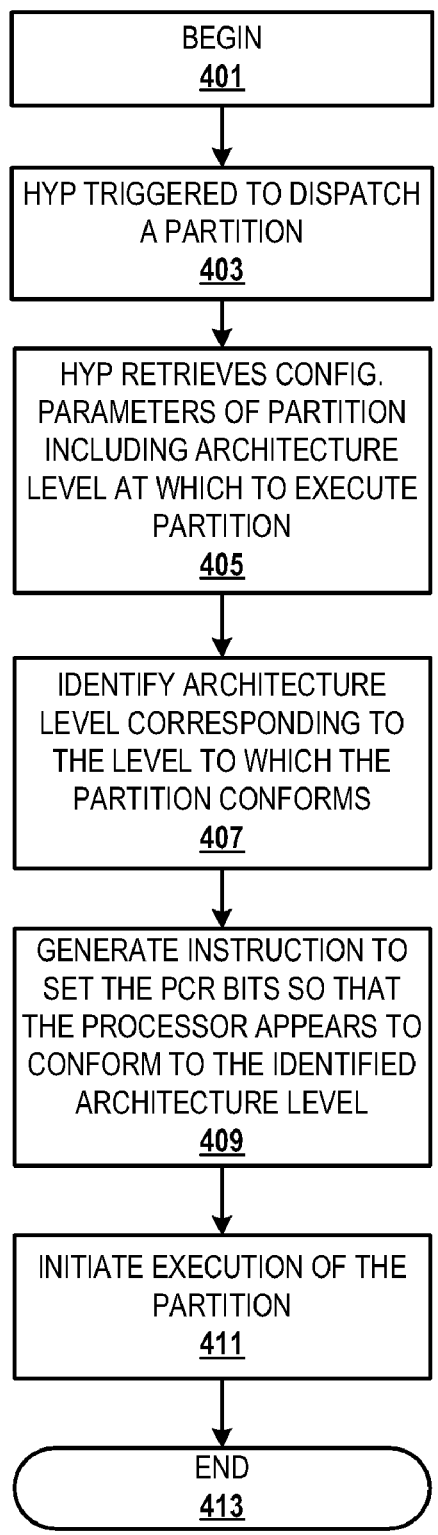
FIG. 4 is an operational flow diagram illustrating the process by which the hypervisor determines the architecture level to which to set the PCR, in accordance with an embodiment of the invention.
Figure 5:
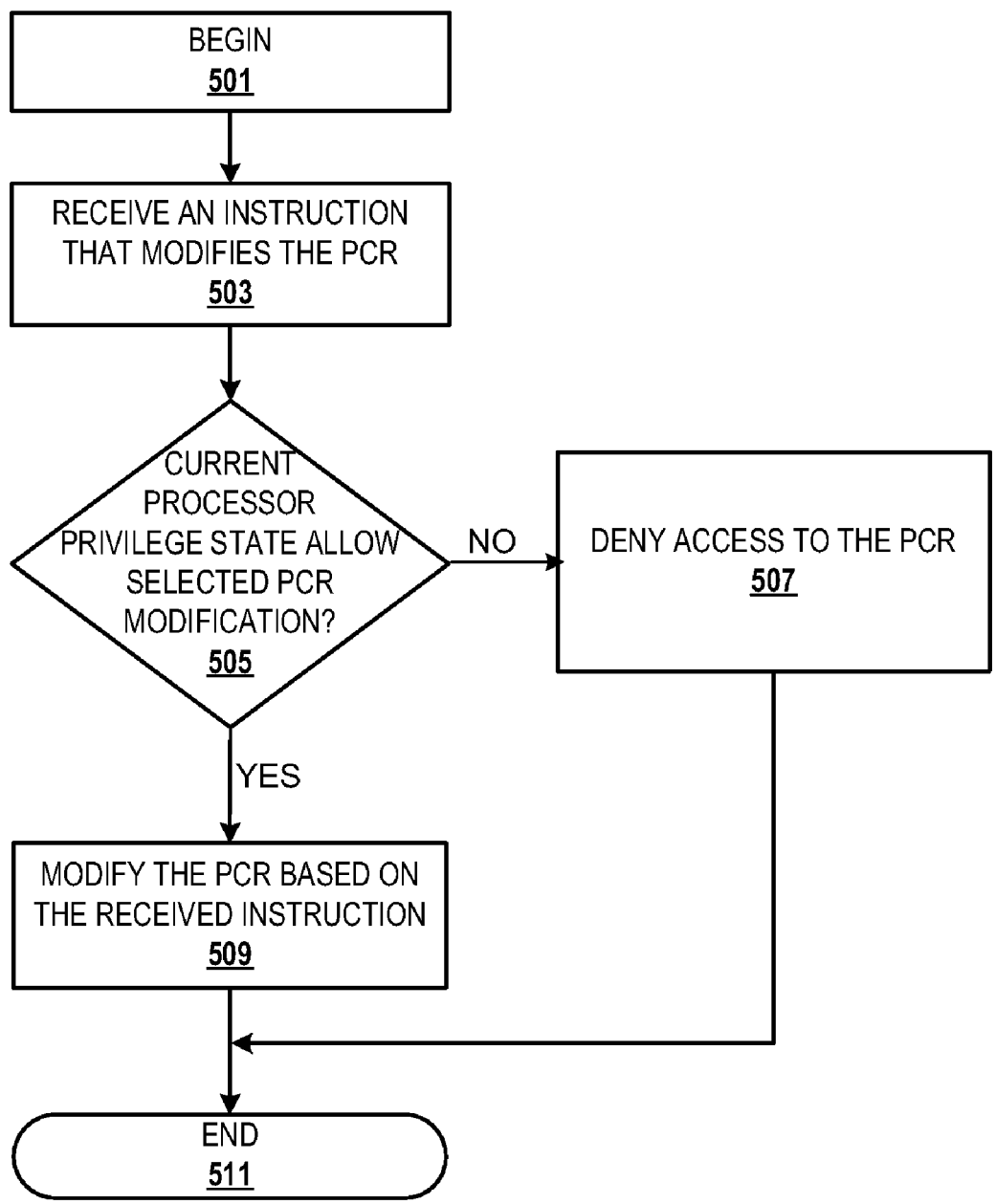
FIG. 5 is an operational flow diagram illustrating the process for setting the bits of the PCR to identify the architecture level to which the processor appears to conform, in accordance with an embodiment of the invention.

FIGS. 4 and 5 are operational flow diagrams generally illustrating the processes performed by the hypervisor (FIG. 4) and the processor (FIG. 5) for updating a PCR during dispatch of a partition. The processes are implemented with components, data, and/or the exemplary operating environments of FIGS. 1-3. Although the processes may be described with reference to components shown in FIGS. 1-3, it should be understood that this is merely for convenience and alternative components can be employed.

Preferably, one or more steps of the processes are embodied in a computer readable medium containing computer readable code such that a series of steps are performed when the computer readable code is executed on a computing device. In some implementations, certain steps of the processes are combined, performed simultaneously or in a different order, or perhaps omitted, without deviating from the scope of processes and their equivalents.

Referring to the hypervisor enabled process, the process of FIG. 4 begins at block 401 and proceeds to block 403 at which the hypervisor is triggered to dispatch a partition on the processor. The control program that initiates the partition's execution calls the hypervisor to inform the hypervisor to allocate processor resources to the partition. At block 405, the hypervisor retrieves (or receives) the various configuration parameters associated with the partition, which parameters include data about the level of processor architecture on which the partition is to be executed. Based on the retrieved architecture level parameters, the hypervisor identifies the architecture level corresponding to the level to which the partition conforms, as indicated at block 407. The hypervisor then generates an instruction to set the corresponding bits of the PCR to the setting for the identified architecture level, as illustrated at block 409. The hypervisor then initiates execution of the partition, as shown at block 411. The process then ends at block 413.

Referring to the processor level process illustrated by FIG. 5, the process begins at block 501 and proceeds to block 503 at which the processor receives an instruction for modifying a PCR. The processor determines, at block 505, whether the current processor privileged state allows the requested modification of the PCR. In one embodiment, this determination involves checking whether the receipt of the instruction occurred while the processor is in a super-privileged (hypervisor) state. When the current processor privileged state does not allow the requested PCR modification (e.g., the processor is not in super-privileged state), access to the PCR is denied, as shown at block 507. If the current processor privileged state does allow the requested PCR modification (e.g., the processor is in super-privileged state), the processor modifies the PCR according to the received instruction, as shown at block 509. The process then ends at block 511.

The above described embodiments of the invention thus provide a method (within a processor of a data processing system) for selecting an architecture level to which a processor appears to conform. The method comprises: (a) setting a value of one or more bits within a processor compatibility register (PCR) within the processor, said value corresponding to an architecture level to which the processor is to appear to conform during subsequent execution of a logical partition or program; and (b) automatically configuring the processor to appear to conform to a particular architecture level, based on the value of the one or more bits within the PCR.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method for selecting in real-time an architecture level to which a processor appears to conform, said method comprising:

setting a value of one or more bits within a pre-assigned processor compatibility register (PCR) within the processor, said value of said pre-assigned PCR identifying an architecture level to which the processor is to conform from the perspective of a logical partition or program during subsequent execution of the logical partition or program on the processor;

wherein the value of the one or more bits within the pre-assigned PCR identifies the architecture level desired for proper execution of the logical partition or program, whose pending execution triggers the setting in real-time of the value of the pre-assigned PCR to configure the processor to operate according to the identified architecture level from among multiple different architecture levels to which the single processor can be configured to conform, wherein each of the multiple different architecture levels is identified by a different value of the one or more bits within the PCR and wherein proper execution of the logical partition or program is not fully supported when the processor operates in a different architecture level from the identified architecture level; and when the processor is not currently configured to operate at the identified architecture level, automatically configuring the processor to conform to the identified architecture level, that corresponds to the value of the one or more bits within the pre-assigned PCR, wherein said automatically configuring re-configures the processor for operation as a newer architecture level processor or an older architecture level processor desired for proper operation of the logical partition or program, based on the value of the bits within the pre-assigned PCR.

2. The method of claim 1, further comprising:
receiving an instruction to modify the PCR;
dynamically modifying the value of the one or more bits within the PCR according to information about a desired architecture level contained within the received instruction; and
selecting the particular architecture level from among multiple possible architecture levels to which the processor may appear to conform based on the value of the one or more bits within the PCR;
wherein the automatically configuring includes modifying functional components of the processor including (a) making available one or more facilities that are new in a corresponding level of the processor architecture and/or (b) removing one or more facilities not available in the corresponding level of processor architecture to enable the processor to subsequently operate in accordance with the architecture level for which the logical partition or program was designed.

3. The method of claim 2, wherein:
when said PCR may be modified only while the processor is in a super-privileged state, said dynamically modifying further comprises modifying the value of the one or more bits only when the instruction is received during processor operation in the super-privileged state; and
when said PCR may be modified while the processor is in one of a super-privileged state and a privileged state, said dynamically modifying further comprises modifying the value of the one or more bits only when the instruction is received during processor operation in one of the super-privileged state and the privileged state.

4. The method of claim 2, wherein said PCR is one of multiple PCRs within said processor, wherein the multiple PCRs affect processor operation when the processor is in super-privileged state, privileged state, or problem state, respectively, said method further comprising:
when the instruction is received at the processor, determining an operating state of the system from among a super-privileged state, a privileged state, and a problem state;
when the operating state is the super-privileged state, said dynamically modifying further comprises modifying the value of the one or more bits of all the PCRs that affect system operation in the privileged state and the problem state; and
when the operating state is the privileged state, said dynamically modifying further comprises modifying the value of the one or more bits of only the PCRs that affect system operation in the problem state; and
when the operating state is the problem state, preventing modification of the one or more bits of the PCRs.

5. The method of claim 1, further comprising:
subsequently executing a program on the processor with the processor appearing to conform to the architecture level identified by the values of the one or more bits within the PCR;
wherein the current architecture level is determined by super-privileged or privileged software that retrieves information about the particular architecture level for the program when the logical partition or program is being dispatched; and
wherein the processor is capable of supporting multiple levels of processor architecture that are respectively selected by a different value of the one or more bits of the PCR.

6. The method of claim 1, further comprising:
defining feature bits within the PCR that disable particular features of the processor; and when a feature bit is set to disable a first feature of the processor, disabling the first feature independent of the architecture level to which the processor appears to conform.

7. The method of claim 1, wherein the modifying functional components comprises modifying processor behavior comprising one or more of:

controlling whether one or more of certain processor instructions, features, functions, registers, including special-purpose registers (SPRs), and other related facilities are available when the processor operates in a problem state; and determining how an instruction field value is interpreted by the processor.

8. A processor, comprising:

at least one execution unit;

a processor compatibility register (PCR) specifying an architecture level to which the processor is to appear to conform during execution of a particular program;

logic for selecting the current architecture level to which the processor appears to conform, said logic comprising logic for:

setting a value of one or more bits within a pre-assigned processor compatibility register (PCR) within the processor, said value of said pre-assigned PCR identifying an architecture level to which the processor is to appear to conform from the perspective of a logical partition or program during subsequent execution of the logical partition or program on the processor;

wherein the value of the one or more bits within the pre-assigned PCR identifies the architecture level desired for proper execution of the logical partition or program, whose pending execution triggers the setting in real-time of the value of the pre-assigned PCR to configure the processor to operate according to the identified architecture level from among multiple different architecture levels to which the single processor can be configured to conform, wherein each of the multiple different architecture levels is identified by a different value of the one or more bits within the PCR and wherein proper execution of the logical partition or program is not fully supported when the processor operates in a different architecture level from the identified architecture level; and when the processor is not currently configured to operate at the identified architecture level, automatically configuring the processor to appear to conform to the identified architecture level, that corresponds to the value of the one or more bits within the pre-assigned PCR, wherein said automatically configuring re-configures the processor for operation as a newer architecture level processor or an older architecture level processor desired for proper operation of the logical partition or program, based on the value of the bits within the pre-assigned PCR.

9. The processor of claim 8, further comprising logic for:

receiving an instruction to modify the PCR;

dynamically modifying the value of the one or more bits within the PCR according to information about a desired architecture level contained within the received instruction; and selecting the particular architecture level from among multiple possible architecture levels to which the processor may appear to conform based on the value of the one or more bits within the PCR;

wherein the logic for automatically configuring includes logic for modifying functional components of the processor including (a) making available one or more facilities that are new in a corresponding level of the processor architecture and/or (b) removing one or more facilities not available in the corresponding level of processor architecture to enable the processor to subsequently operate in accordance with the architecture level for which the logical partition or program was designed.

10. The processor of claim 9, wherein said PCR is one of multiple PCRs within said processor, wherein the multiple PCRs affect processor operation when the processor is in super-privileged state, privileged state, or problem state, said processor further comprising:

when the instruction is received at the processor, logic for determining an operating state of the system from among a super-privileged state, a privileged state, and a problem state;

when said PCR may be modified only while the processor is in a super-privileged state, said logic for dynamically modifying further comprises logic for modifying the value of the one or more bits only when the instruction is received during system operation in the super-privileged state;

when said PCR may be modified while the processor is in one of a super-privileged state and a privileged state, said logic for dynamically modifying further comprises logic for modifying the value of the one or more bits only when the instruction is received during processor operation in one of the super-privileged state and the privileged state;

when the operating state is the super-privileged state, said logic for dynamically modifying further comprises logic for modifying the value of the one or more bits of all the PCRs that affect system operation in the privileged state and the problem state;

when the operating state is the privileged state, said logic for dynamically modifying further comprises logic for modifying the value of the one or more bits of only the PCRs that affect system operation in the problem state; and when the operating state is the problem state, logic for preventing a modification of the one or more bits of the PCRs.

11. The processor of claim 8, further comprising:

logic for subsequently executing a program on the processor with the processor appearing to conform to the architecture level identified by the values of the one or more bits within the PCR;

wherein the current architecture level is determined by super-privileged or privileged software that retrieves information about the particular architecture level for the program when the logical partition or program is being dispatched; and wherein the processor is capable of supporting multiple levels of processor architecture that are respectively selected by a different value of the one or more bits of the PCR.

12. The processor of claim 8, wherein the PCR further comprises one or more feature bits, and the processor further comprises:

logic for defining feature bits within the PCR that disable particular features of the processor; and when a feature bit is set to disable a first feature of the processor, logic for disabling the first feature independent of the architecture level to which the processor appears to conform.

13. A data processing system comprising:
a memory having therein code for executing a super-privileged client during a super-privileged state of operation;
a processor coupled to the memory via an interconnect, said processor having:
  at least one execution unit;
  a processor compatibility register (PCR) specifying an architecture level to which the processor is to appear to conform during execution of a particular program;
  logic for selecting the current architecture level to which the processor appears to conform, said logic comprising logic for:
    setting a value of one or more bits within a pre-assigned processor compatibility register (PCR) within the processor, said value of said pre-assigned PCR identifying an architecture level to which the processor is to appear to conform from the perspective of a logical partition or program during subsequent execution of the logical partition or program on the processor;
    wherein the value of the one or more bits within the pre-assigned PCR identifies the architecture level desired for proper execution of the logical partition or program, whose pending execution triers the setting in real-time of the value of the pre-assigned PCR to configure the processor to operate according to the identified architecture level from among multiple different architecture levels to which the single processor can be configured to conform, wherein each of the multiple different architecture levels is identified by a different value of the one or more bits within the PCR and wherein proper execution of the logical partition or program is not fully supported when the processor operates in a different architecture level from the identified architecture level; and
    when the processor is not currently configured to operate at the identified architecture level, automatically configuring the processor to appear to conform to the identified architecture level, that corresponds to the value of the one or more bits within the pre-assigned PCR, wherein said automatically configuring re-configures the processor for operation as a newer architecture level processor or an older architecture level processor desired for proper operation of the logical partition or program, based on the value of the bits within the pre-assigned PCR.

14. The data processing system of claim 13, said processor further comprising:
  logic for receiving an instruction to modify the PCR;
  logic for dynamically modifying the value of the one or more bits within the PCR according to information about a desired architecture level contained within the received instruction; and
  logic for selecting the particular architecture level from among multiple possible architecture levels to which the processor may appear to conform based on the value of the one or more bits within the PCR;
  wherein the logic for automatically configuring includes logic for modifying functional components of the processor including (a) making available one or more facilities that are new in a corresponding level of the processor architecture and/or (b) removing one or more facilities not available in the corresponding level of processor architecture to enable the processor to subsequently operate in accordance with the architecture level for which the logical partition or program was designed.

15. The data processing system of claim 14, wherein:
  when said PCR may be modified only while the processor is in a super-privileged state, said logic for dynamically modifying further comprises logic for modifying the value of the one or more bits only when the instruction is received during processor operation in the super-privileged state; and
  when said PCR may be modified while the processor is in one of a super-privileged state and a privileged state, said program logic for dynamically modifying further comprises logic for modifying the value of the one or more bits only when the instruction is received during processor operation in one of the super-privileged state and the privileged state.

16. The data processing system of claim 13, wherein said PCR is one of multiple PCRs within said processor, wherein the multiple PCRs affect processor operation when the processor is in super-privileged state, privileged state or problem state, said processor further comprising:
  when the instruction is received at the processor, logic for determining an operating state of the system from among a super-privileged state, a privileged state, and a problem state;
  when the operating state is the super-privileged state, said logic for dynamically modifying further comprises logic for modifying the value of the one or more bits of all the PCRs that affect system operation in the privileged state and the problem state;
  when the operating state is the privileged state, said logic for dynamically modifying further comprises logic for modifying the value of the one or more bits of only the PCRs that affect system operation in the problem state; and
  when the operating state is the problem state, logic for preventing a modification of the one or more bits of the PCRs.

17. The data processing system of claim 13, further comprising:
  logic for subsequently executing a program on the processor with the processor appearing to conform to the architecture level identified by the values of the one or more bits within the PCR;
  wherein the current architecture level is determined by super-privileged or privileged software that retrieves information about the particular architecture level for the program when the logical partition or program is being dispatched; and
  wherein the processor is capable of supporting multiple levels of processor architecture that are respectively selected by a different value of the one or more bits of the PCR.

18. The data processing system of claim 13, wherein the PCR further comprises one or more feature bits, and the processor further comprises:
  logic for defining feature bits within the PCR that disable particular features of the processor; and
  when a feature bit is set to disable a first feature of the processor, logic for disabling the first feature independent of the architecture level to which the processor conforms.

19. The data processing system of claim 13, further comprising:
  a plurality of processors, wherein each processor includes one or more PCRs, which are independently modifiable to accommodate multiple architecture levels concurrently running on the data processing system under control of one or more hypervisors.

20. The data processing system of claim 13, wherein the logic for modifying functional components comprises logic for modifying processor behavior comprising one or more of:

logic for controlling whether one or more of certain processor instructions, features, functions, registers, including special-purpose registers (SPRs), and other related facilities are available when the processor operates in a problem state; and logic for determining how an instruction field value is interpreted by the processor.

* * * * *